(12) United States Patent
Becker et al.

(10) Patent No.: US 7,775,131 B2
(45) Date of Patent: Aug. 17, 2010

(54) ACTUATOR FOR A MOTOR VEHICLE SEAT

(75) Inventors: Burkhard Becker, Solingen (DE); Wilfried Beneker, Leichlingen (DE)

(73) Assignee: C. Rob Hammerstein GmbH & Co. KG, Solingen (DE)

( * ) Notice: Subject to any disclaimer, the term of this patent is extended or adjusted under 35 U.S.C. 154(b) by 433 days.

(21) Appl. No.: 11/413,299

(22) Filed: Apr. 28, 2006

(65) Prior Publication Data

US 2006/0260424 A1 Nov. 23, 2006

(30) Foreign Application Priority Data

Apr. 28, 2005 (DE) ........................ 10 2005 020 171

(51) Int. Cl.
*F16H 29/20* (2006.01)
*F16H 57/02* (2006.01)

(52) U.S. Cl. .................... 74/89.23; 74/89.14; 74/606 R

(58) Field of Classification Search ..................... 74/89, 74/89.14, 89.23, 424.71, 89.34, 606 R, 416, 74/417, 425; 297/330, 344.11, 344.2, 344.12, 297/344.13, 344.14, 362.11, 362, 12, 14
See application file for complete search history.

(56) References Cited

U.S. PATENT DOCUMENTS

| | | | | |
|---|---|---|---|---|
| 3,617,021 A | | 11/1971 | Littmann | |
| 4,108,021 A | * | 8/1978 | MacAfee et al. | ........... 74/606 R |
| 4,172,367 A | * | 10/1979 | McCusker | .................. 464/177 |
| 4,216,624 A | * | 8/1980 | Blankenburg et al. | .......... 49/352 |
| 4,802,374 A | * | 2/1989 | Hamelin et al. | ............. 74/89.14 |
| 4,947,699 A | * | 8/1990 | Zupancic | ...................... 74/425 |
| 5,052,752 A | * | 10/1991 | Robinson | ................ 297/362.14 |
| 5,163,335 A | * | 11/1992 | Isom et al. | ........................ 74/6 |
| 5,199,764 A | * | 4/1993 | Robinson | ................ 297/362.11 |
| 5,259,257 A | * | 11/1993 | Mouri | ........................ 248/429 |
| 5,957,117 A | * | 9/1999 | Everingham | ........... 123/568.26 |
| 6,073,893 A | | 6/2000 | Koga | |
| 6,081,647 A | * | 6/2000 | Roth et al. | ................... 385/139 |
| 6,260,922 B1 | * | 7/2001 | Frohnhaus et al. | .......... 297/330 |
| 6,322,146 B1 | | 11/2001 | Fisher, Jr. | |
| 6,575,421 B1 | * | 6/2003 | Houston et al. | ............. 248/429 |

(Continued)

FOREIGN PATENT DOCUMENTS

WO WO 86/06036 4/1986

(Continued)

*Primary Examiner*—Thomas R Hannon
*Assistant Examiner*—Phillip A Johnson
(74) *Attorney, Agent, or Firm*—McCarter & English, LLP

(57) ABSTRACT

An actuator for a motor vehicle, more specifically for a motor vehicle seat. The actuator comprises an electric motor having an output shaft, a gear that is connected to the output shaft and including a gear housing having two partially cylindrical exterior surfaces, and a spindle that communicates with the gear, the spindle defining a threading and runs transversely with respect to the output shaft. Further, the actuator comprises a gear retainer that (a) forms a surrounding grip around the gear housing, in which (b) the gear housing is held pivotal about a pivot axis that runs parallel to the output shaft, that (c) has two partially cylindrical interior surfaces, each mating the exterior surfaces against which they fit, and that (d) includes a recess or two recesses for the passage of the spindle. The gear retainer has fastening holes running parallel to the pivot axis.

22 Claims, 4 Drawing Sheets

U.S. PATENT DOCUMENTS

| | | | |
|---|---|---|---|
| 6,915,998 B2 * | 7/2005 | Borbe et al. | 248/429 |
| 7,048,244 B2 * | 5/2006 | Hauck | 248/430 |
| 7,051,986 B1 * | 5/2006 | Taubmann et al. | 248/429 |
| 7,143,513 B2 * | 12/2006 | Taubmann et al. | 29/893.1 |
| 7,340,974 B2 * | 3/2008 | Landskron et al. | 74/425 |
| 2002/0073790 A1 * | 6/2002 | Wiesler et al. | 74/89.34 |
| 2004/0188589 A1 * | 9/2004 | Maruyama et al. | 248/674 |
| 2005/0044974 A1 * | 3/2005 | Wagner | 74/89.23 |
| 2005/0126333 A1 * | 6/2005 | Dohles et al. | 74/606 R |
| 2006/0060015 A1 * | 3/2006 | Hofschulte et al. | 74/89.23 |

FOREIGN PATENT DOCUMENTS

| | | |
|---|---|---|
| WO | WO 03/068551 | 8/2003 |

\* cited by examiner

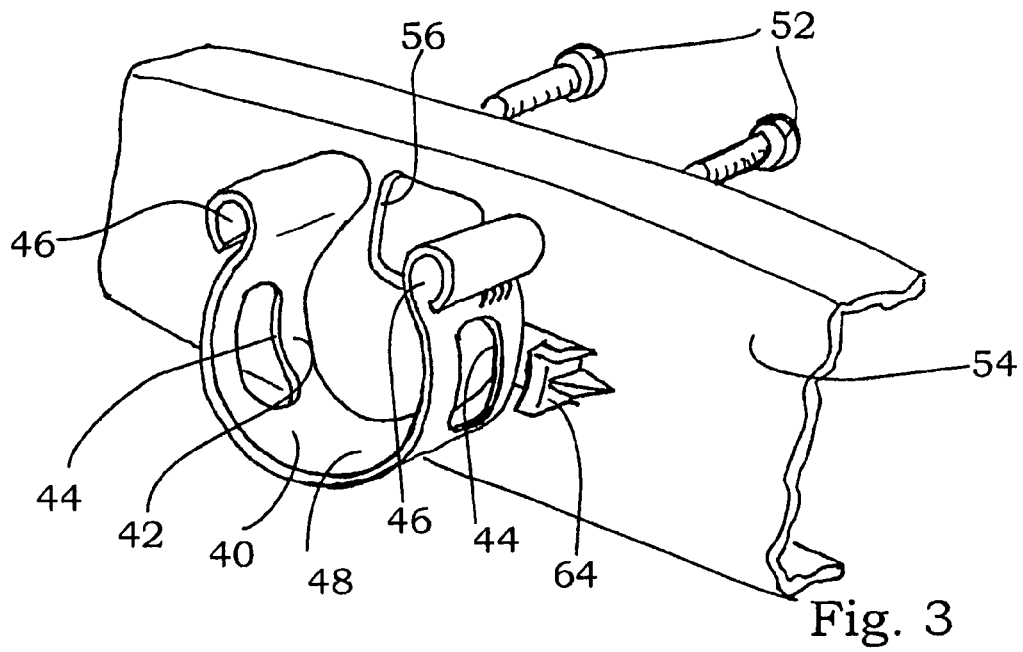
Fig. 3
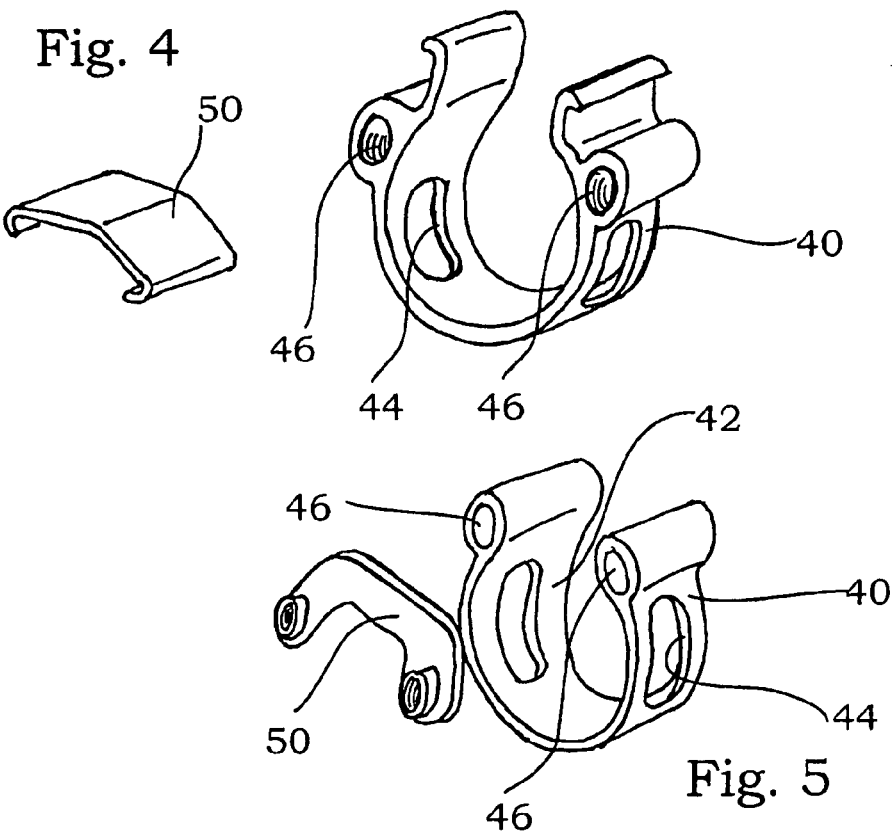
Fig. 4
Fig. 5

ACTUATOR FOR A MOTOR VEHICLE SEAT

CROSS-REFERENCE TO RELATED APPLICATIONS

This application claims priority to German Application No. DE102005020171.7, filed Apr. 28, 2005, the contents of which are expressly incorporated by reference in their entirety as part of the present disclosure.

BACKGROUND

The invention relates to an actuator for a motor vehicle seat, more specifically for a motor vehicle seat as set forth in the preamble of patent claim 1. Such an actuator has been known from WO 86/06036, where it is more specifically illustrated in FIG. 4. Further, a similar actuator can also be seen from FIG. 4 of U.S. Pat. No. 3,617,021 in particular. Finally, WO 03/068551 also shows an equivalent actuator.

Actuators of this type are quite usual in prior art and have proved efficient. The reader is additionally referred to U.S. Pat. No. 6,073,893 and to U.S. Pat. No. 6,322,146 B1.

In prior art, the gear housing and the gear retainer must be matched, using complex methods. This requires considerable effort and expense, in particular as far as the gear retainer is concerned. The gear housing is mostly composed of discrete housing parts made from metal or from a plastic material. At the interface of the parts to be joined, joint mismatch results in a step being formed and in the housing being inaccurately mounted in the gear retainer. The gear retainer must be matched accordingly and may for example be made from two parts that are assembled individually.

The invention therefore aims at developing the actuators already existing in many different implementations and at providing an actuator that is, as far as practicable, easy to manufacture industrially, suitable for large-scale production, that requires least possible matching of the respective parts and can be manufactured at a low cost.

SUMMARY

It is therefore the object of the invention to develop the actuator of the type mentioned herein above in such a manner that the gear retainer be, as far as practicable, easy to manufacture on a large scale with the discrete parts thereof being easy to match and to assemble.

This object is achieved by the actuator herein described and comprising an electric motor having an output shaft; a gear connected to the output shaft and including a gear housing having two partially cylindrical exterior surfaces; and a spindle that communicates with the gear and runs transversely with respect to the output shaft, the spindle defining a threading. Further, the actuator comprises a gear retainer that (a) forms a surrounding grip around the gear housing, in which (b) the gear housing is held pivotal about a pivot axis that runs parallel to the output shaft, that (c) has two partially cylindrical interior surfaces, each mating the exterior surfaces against which they fit, and that (d) includes a recess or two recesses for the passage of the spindle, wherein the gear retainer defines fastening holes running parallel to the pivot axis.

In this actuator, the gear retainer is made from a precisely imposed component part, said gear retainer being more specifically preferred to be a cut piece of an extruded profile made from aluminium. Such a gear retainer can be manufactured with high precision at a low cost. As a result, in a preferred development, the gear retainer needs no longer be individually matched with the respective gear housing. Preferably, the tube-like profile piece from which the gear retainer is cut to length may be configured to be an annular closed part. The fastening holes may be formed directly during manufacturing and advantageously extend over the entire axial length of the gear retainer. Any number of fastening holes can be formed, with two or three fastening holes being preferably provided. Through the fastening holes, the actuator can be solidly connected to a component part of the motor vehicle seat, more specifically to a side part or another part of an underframe such as a rail of a longitudinal guide.

In a preferred developed implementation, the gear housing is configured such that a respective portion of the gear housing forms at least one complete partially cylindrical exterior surface, with the two partially cylindrical exterior surfaces being preferably implemented from one single component part of the gear housing. The other parts of the gear housing are matched accordingly and permit to close the gear housing so as to completely include the gear parts.

BRIEF DESCRIPTION OF THE DRAWINGS

Other features and advantages of the invention will become more apparent upon reviewing the dependent claims and the following non restrictive description of implementations of the invention, given by way of example only with reference to the drawing. In said drawing:

FIG. 3: is a perspective illustration of a gear retainer made from a sheet metal blank, of a side part of a motor vehicle seat and of two fastening screws;

FIG. 4: is a perspective illustration similar to FIG. 3 of a gear retainer composed of a portion of an extruded aluminium profile in the shape of a channel on the one side and of a closure part on the other side;

FIG. 5: is an illustration similar to FIG. 4 of a portion of an extruded aluminium profile with associated closure part in another implementation;

DETAILED DESCRIPTION

Figure 1:
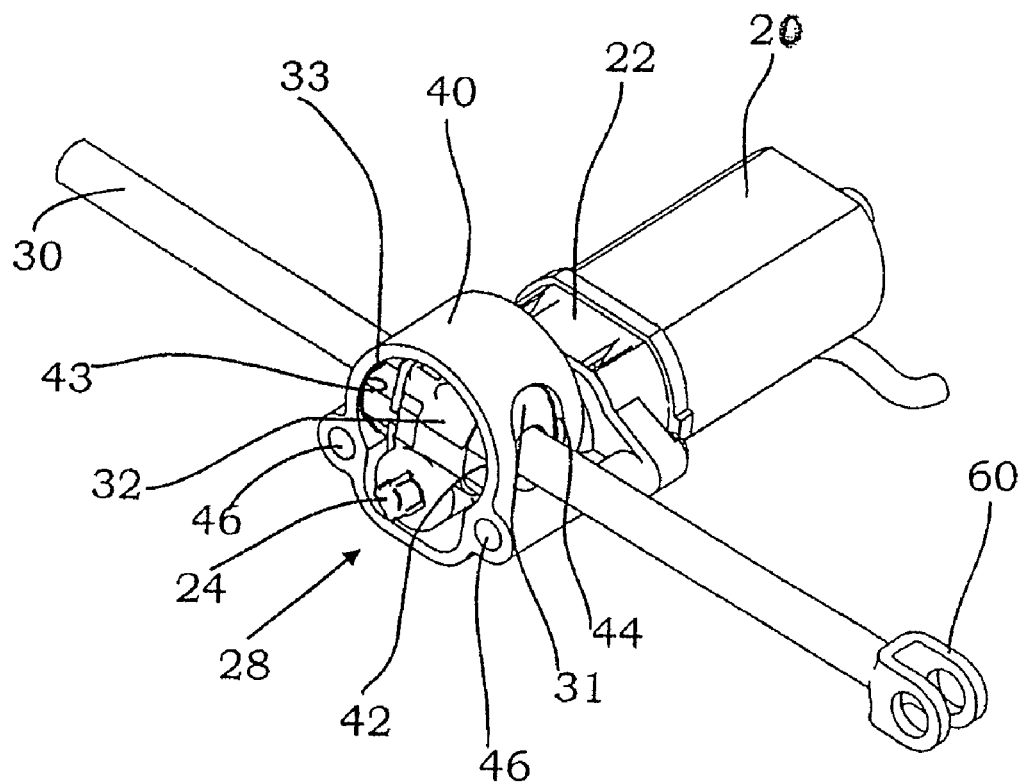
FIG. 1: is a perspective illustration of an actuator with a continuous, movable spindle.
Figure 2:
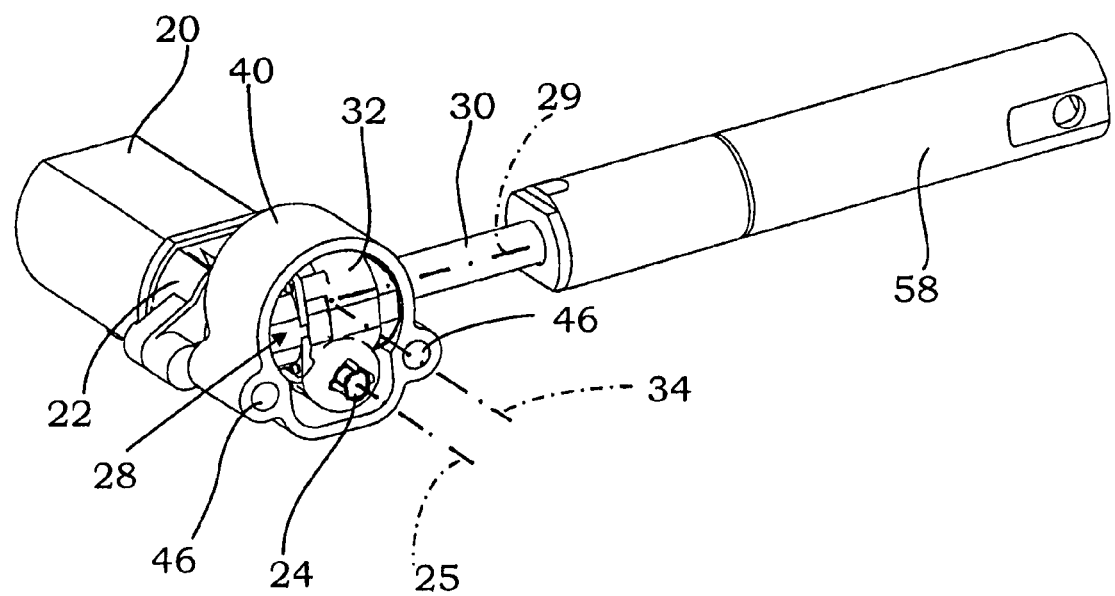
FIG. 2: is an illustration like FIG. 1, but with a rotatable, stationary spindle.
Figure 6:
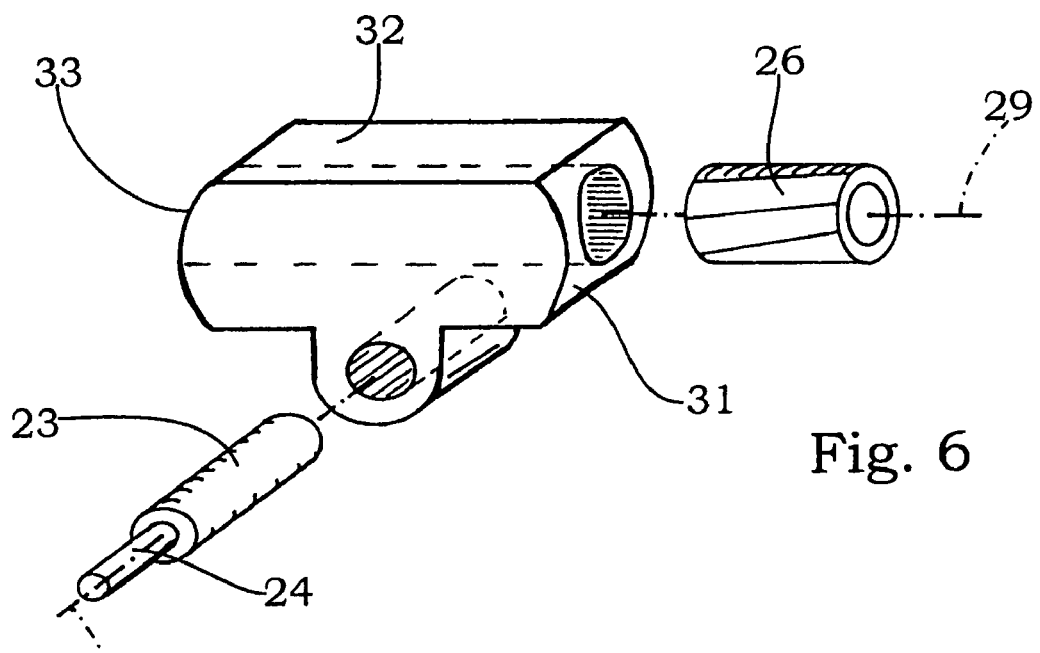
FIG. 6: is a perspective illustration of a gear housing with integrally connected exterior surfaces.

The FIGS. 1 and 2 show two different complete actuators for a motor vehicle, more specifically for a motor vehicle seat. An electric motor 20 with an attached reduction gear 22 has an output shaft 24 that is non-rotatably linked to an endless screw 23 that engages a spindle nut 26. Said spindle nut 26 is part of a gear 28 and engages a spindle 30; it forms a surrounding grip around spindle 30. Gear 28 further has a gear housing 32. It is preferably made from a plastic material and can be made from one piece as shown in FIG. 6, although it usually is composed of two or more housing parts. It may also be manufactured from a metal. The gear housing 32 has two partially cylindrical exterior surfaces 31, 33 that are centered on a common pivot axis or central axis 34. The two partially cylindrical exterior surfaces 31, 33 are located at opposing 180 degree positions. A reduction gear needs not be provided, it may be eliminated.

A gear retainer 40 forms a surrounding grip around the gear housing 32. The gear housing 32 is carried and retained therein so as to be pivotal about the pivot axis 34. The pivot axis 34 runs parallel to the output shaft 24, FIG. 2 also showing the axial line 25 of the output shaft 24. The gear retainer 40 has two partially cylindrical interior surfaces 42, 43. They are centered on the pivot axis 34. The two partially cylindrical exterior surfaces 31, 33 are also centered on the pivot axis 34. The two partially cylindrical interior surfaces 42, 43 match the two partially cylindrical exterior surfaces 31, 33, the surfaces respectively forming pairs 31, 42 and 33, 43 and being directly adjacent. Finally, the gear retainer 40 has at least one passageway or recess 44 for the spindle; in the implementation shown in FIG. 1, there are provided two substantially opposing recesses 44, in the implementation shown in FIG. 2, there is provided only one recess 44. In the implementations shown in the FIGS. 3 through 5, there are respectively provided 2 opposing recesses 44. The recesses extend in the circumferential direction, meaning peripherally about the pivot axis 34, in an angular range leaving free the desired pivot angle for the spindle 30 to pivot about with respect to the gear retainer 40. The maximum pivot angle is for example 30°, it may also be smaller.

In the two first exemplary embodiments shown in FIG. 1 and FIG. 2, the gear retainer 40 is made from a portion of an extruded aluminium profile. For this purpose, a corresponding profile is simply cut to length and the at least one recess 44 is formed therein. The extruded profile innately has fastening holes 46 formed therein during manufacturing, said holes extending over the entire axial length and running parallel to the pivot axis 34. In the exemplary implementations shown, these fastening holes 46 are located outside the inner volume of the gear retainer 40. They may however also be provided in part or in whole in the inner volume, the exemplary embodiment shown in FIG. 7 for example offering enough space in the lower part inside the circular inner volume of the gear retainer 40.

The fastening holes 46 serve to connect the gear retainer 40 to a portion of the motor vehicle seat, for example to a side part 54. Both the gear 28 and the electric motor 20 are fastened via the gear retainer 40. In this case, the electric motor 20 needs no further fastening of its own.

In the implementation shown in FIG. 3, the gear housing 32 is made from a sheet metal blank 48, which is rectangular. It is given the shape shown in FIG. 3 and is rolled for example. The fastening holes 46 are thereby also formed in the border regions. The passageways 44 may be formed therein prior to the rolling process or thereafter.

The gear retainers 40 discussed hereto before are made from one piece. This also applies to the gear housing 32 shown in FIG. 7. The two implementations illustrated in the FIGS. 4 and 5 show two-part gear housings 32. A closure part 50 is still added to the actual gear housing 32. The actual gear housings 32 in the embodiment shown in the FIGS. 4 or 5 are portions of an appropriate extruded profile in which the passageways 44 are formed separately. The free profile ends of the actual gear retainer 40 shown in FIG. 4 have outwardly directed lugs. The approximately roof-shaped closure part 50 has inwardly directed border regions for engaging behind said profile ends. A pre-bias may thus be introduced into the gear retainer 40. For this purpose, the closure part 50 may also be slightly wedge-shaped.

In the implementation shown in FIG. 5, the closure part 50 is a bracket which concurrently forms nuts for fastening screws 52.

In the implementations shown in FIG. 1 or FIG. 2, the gear retainer 40 forms a closed ring. This also applies to the exemplary implementation shown in FIG. 7. In the implementation shown in FIG. 3, the gear retainer 40 is not a completely closed ring but extends over far more than 270°. The fastening holes 46 are located on the profile ends.

In the implementations shown in FIG. 4 or FIG. 5, the actual gear retainer 40 is configured similar to the gear retainer 40 shown in FIG. 3, this time however, it forms a closed ring thanks to the closure part 50.

In the implementation shown in FIG. 2, it can be seen concretely, thanks to the axial lines, that the pivot axis 34 intersects the axial line 29 of the spindle 30. Although not shown, this is also the case in the exemplary implementation shown in FIG. 1. In the implementation shown in FIG. 7 however, the axial line 29 of spindle 30 does not intersect the pivot axis 34, pivot axis 34 rather coincides with the axial line 25 of the output shaft 24. The advantage thereof is that the electric motor 20 may be secured separately at an appropriate location and does not necessarily move together with the gear 28 as this is the case in the implementations shown in FIG. 1 and in FIG. 2 for example. As a result, no space has to be left free for the electric motor 20 to move. The electric feeders of the electric motor 20 need not be movable for adjustment.

In all of the exemplary implementations shown, the two partially cylindrical interior surfaces 42, 44 of the gear retainer 40 are formed on one single component part, namely on the gear retainer 40 of the exemplary implementations shown in the FIGS. 1, 2, 3 and 7 or on the actual gear retainer 40 of the exemplary implementations shown in the FIGS. 4 and 5. Such an integral embodiment of the two partially cylindrical interior surfaces 42, 43 is advantageous and increases the precision, but it is not absolutely necessary. Also, it is very advantageous to have the two partially cylindrical exterior surfaces 31, 33 configured to be integral each in itself or on a component part, meaning not to have them realized by two separate housing parts for example. It is more specifically advantageous to have the two partially cylindrical exterior surfaces 31, 33 formed on one and the same housing part.

This is shown in FIG. 6. Here, the gear housing 32 is realized by a single component part, such a construction is known from U.S. Pat. No. 4,802,374, see FIG. 5 thereof. As contrasted with the previously known gear housing 32, the two partially cylindrical exterior surfaces 31, 33 are now additionally formed on the one-piece gear housing 32. As a result, the gear housing 32 shown in FIG. 6 is directly suitable for use in the exemplary implementation shown in FIG. 1 or 2 for example.

FIG. 3 shows a side part 54 of a motor vehicle seat. This side part 54 stands for any part of the motor vehicle seat that is intended to be adjusted with respect to another part or with respect to which another part is intended to be adjusted. In the side part 54 there are provided two holes that can be seen from FIG. 3, they are directly aligned with the fastening holes 46 through which the two fastening screws 52 extend. In the assembled condition, meaning in the complete actuator, the electric motor 20 is located on the same side of the side part 54 as the gear retainer 40 shown. A window 56 for the output shaft 24 is provided in the side part 54. As depicted the side part 54 has a retaining device 64 for the gear retainer.

Figure 7:
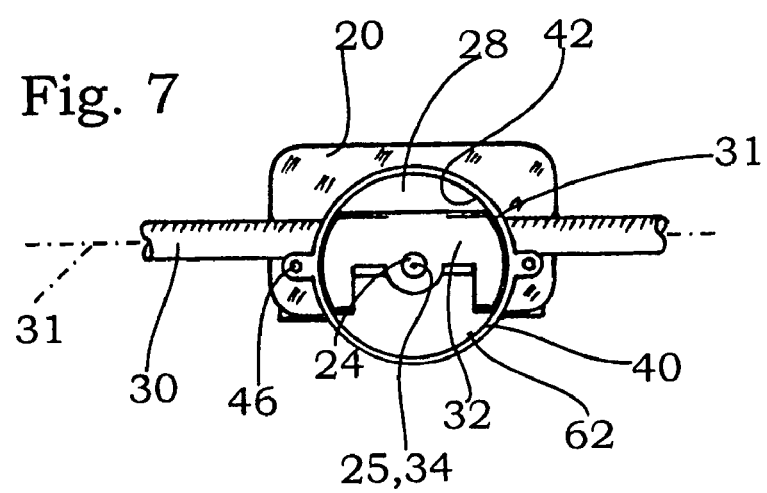
FIG. 7: is a front view of an actuator with an electric motor and an adjustable spindle, said actuator having the output shaft located in the center of the gear housing.

In the exemplary implementation shown in FIG. 2, a receiving part 58 is disposed on the spindle 30 which in this exemplary implementation is stationary but rotated through the gear 28. It has holes through which it can be fastened to a part that is to be adjusted. In the implementation shown in FIG. 1, there is provided a corresponding retaining member 60. FIG. 7 shows limit stops 62 that bound the pivot range of the gear 28 within the gear retainer 40 in at least one pivot direction about the pivot axis 34.

What is claimed is:

1. A combination of an actuator for a motor vehicle seat and a component part of the motor vehicle seat, wherein the actuator comprises:
- an electric motor having an output shaft; the output shaft defining an axial direction;
- a gear connected to the output shaft and including a gear housing having two partially cylindrical exterior surfaces;
- a spindle that communicates with the gear and runs transversely with respect to the output shaft, the spindle defining a threading; and
- a gear retainer that (a) forms a surrounding grip around the gear housing, in which (b) the gear housing is held pivotal about a pivot axis that runs parallel to the output shaft, that (c) has two partially cylindrical interior surfaces, each mating to the two partially cylindrical exterior surfaces against which they fit, that (d) includes a recess or two recesses for the passage of the spindle, (e) defines fastening holes running parallel to the pivot axis, and having a length that is substantially equal to an axial length over which the gear retainer extends in the axial direction, and (f) is one piece, and wherein the component part comprises holes that are aligned with the fastening holes, wherein the electric motor is located on the same side of the component part as the gear retainer, and wherein the gear retainer of the actuator directly contacts and is solidly connected to the component part.

2. The combination as set forth in claim 1, wherein the gear retainer is made from a tube profile.

3. The combination as set forth in claim 2, wherein the gear retainer comprises a closure part forming, together with the tube-like profile, a closed ring.

4. The combination as set forth in claim 1, wherein the gear retainer is made from a sheet metal blank that is curved into a tube-like shape and is more specifically rolled.

5. The combination as set forth in claim 4, wherein the gear retainer comprises a closure part forming, together with the tube-like profile, a closed ring.

6. The combination as set forth in claim 1, wherein the gear retainer is pre-biased against the gear housing.

7. The combination as set forth in claim 1, wherein the recesses are configured to be long holes having a longitudinal direction, the longitudinal direction extends in a circumferential direction.

8. The combination as set forth in claim 1, wherein limits stops are provided for bounding the pivot range of the gear inside the gear retainer in at least one pivot direction about the pivot axis.

9. The combination as set forth in claim 1, wherein the spindle is solidly mounted in the gear, the gear retainer comprises only one recess through which the spindle projects and there is provided a spindle nut that is screwed onto the spindle.

10. The combination as set forth in claim 1, wherein the spindle extends through the gear and is longitudinally movable relative to the gear and that there are provided two recesses through which the spindle projects.

11. The combination as set forth in claim 1, wherein the gear is mechanically connected to the electric motor to form one unit, more specifically that the gear can only be moved in the gear housing together with the electric motor.

12. The combination as set forth in claim 1, wherein the gear housing has a plastic surface.

13. The combination as set forth in claim 1, wherein the component part comprises at least one retaining device for the gear retainer.

14. The combination as set forth in claim 1, wherein the component part comprises at least one window.

15. The combination as set forth in claim 1, wherein the two partially cylindrical exterior surfaces are centered on the pivot axis.

16. The combination as set forth in claim 1, wherein the pivot axis intersects the axial line of the spindle or the axial line of the output shaft.

17. The combination as set forth in claim 1, wherein the gear housing is made from a plastic material.

18. The combination as set forth in claim 1, wherein screws are provided, the screws extend through the fastening holes and the screws solidly connect the actuator to the component part.

19. The combination as set forth in claim 1, wherein the gear retainer is a cut piece cut of an extended profile, and the fastening holes are provided in the extended profile.

20. The combination as set forth in claim 1, wherein the gear retainer is a cut piece cut of an extended extruded profile, and the fastening holes are provided in the extended profile.

21. The combination as set forth in claim 1, wherein the component part is a side part of the motor vehicle seat.

22. A combination of an actuator for a motor vehicle seat and a component part of the motor vehicle seat, wherein the actuator comprises:
- an electric motor having an output shaft; the output shaft defining an axial direction;
- a gear connected to the output shaft and including a gear housing having two partially cylindrical exterior surfaces;
- a spindle that communicates with the gear and runs transversely with respect to the output shaft, the spindle defining a threading; and
- a gear retainer that (a) forms a surrounding grip around the gear housing, in which (b) the gear housing is held pivotal about a pivot axis that runs parallel to the output shaft, that (c) has two partially cylindrical interior surfaces, each mating to the two partially cylindrical exterior surfaces against which they fit, that (d) includes a recess or two recesses for the passage of the spindle, (e) defines fastening holes running parallel to the pivot axis, and having a length that is substantially equal to an axial length over which the gear retainer extends in the axial direction, (f) is one piece, and (g) has an open side in the axial direction, and wherein the component part comprises holes that are aligned with the fastening holes, the component part covers the open side of the gear retainer, the component part and the gear retainer delimit a cup shaped unit that is open toward the electric motor, the electric motor is located on the same side of the component part as the gear retainer, and the gear retainer of the actuator directly contacts and is solidly connected to the component part.

* * * * *